May 21, 1957 A. J. MOLDENHAUER 2,793,119
PROCESS AND APPARATUS FOR COMMINUTING FODDER
Filed Feb. 6, 1952 3 Sheets-Sheet 3

INVENTOR:
August J. Moldenhauer
BY John R. Bruninga
ATTORNEYS.

United States Patent Office 2,793,119
Patented May 21, 1957

2,793,119

PROCESS AND APPARATUS FOR COMMINUTING FODDER

August J. Moldenhauer, Menfro, Mo., assignor of one-third to John H. Bruninga, St. Louis, Mo.

Application February 6, 1952, Serial No. 270,140

11 Claims. (Cl. 99—8)

This invention relates to the art of treating fodder generally, and more particularly such legumes as alfalfa, the various clovers and the various lespedezas, etc., soy beans, cow peas and fodder generally. This application embodies subject-matter common to application Serial No. 41,309, filed July 29, 1948, now Patent No. 2,588,865, issued March 11, 1952.

Various processes and apparatuses have been employed and suggested for the treatment of fodder in order to reduce the same to a meal. Probably the first method employed was to take the sun-cured or dehydrated fodder and subject the same to centrifugal-impacting-comminution, viz., by passing the same through an ordinary hammer mill. Later that was followed by dehydrating the fodder by artificial heat before such comminution.

One of the objects of this invention is to provide novel process and apparatus for comminuting fodder in an expeditious and effective manner.

A fodder consists of leaf and stem components. Of these the leaf components are the most valuable from a feeding point and contain a higher percentage of carotene and vitamin A components and has a most favorable relation of protein to crude fiber. This has been recognized and methods have therefore been resorted to in order to separate the leaf component from the stem component. One of such methods is ordinary sifting after the fodder has been reduced to a meal. Such a method is, however, unsatisfactory, requiring as it does not only very fine screens and extended sifting operation, but the tough and hard fibrous stem must be subjected to comminuting hammermilling action simultaneously with the more brittle leaf, resulting in high cost in the over-all process. The concurrent comminution of the leaf and stem also renders difficult the separation of the stem and leaf components after comminution. While it has been proposed to preliminarily sift the leaves from sun-cured fodder at various stages, such a proceeding is not effective.

Another object of this invention therefore is to provide a process of treating fodder to reduce the same to a meal in which the fine and coarse components, viz., leaf and stem components of the fodder are actually separated during the course of dehydration and comminution, in a simple and effective manner.

In accordance with an illustrative embodiment of this invention, where the material is subjected to comminution by a hammermilling action it is subjected to forces causing separation of the finer leaf and the coarser stem components during the course of such comminution. The process is so carried out and such means are provided that the leaf and the stem components are separated axially during the course of comminution, but in such a manner as to cause efficient separation. The leaf and stem are then separately collected for packaging or storage. In accordance with applicant's embodiment, the comminution is brought about by a hammermilling operation, that is, in a well-known hammer mill, in which a rotor operates within a perforated casing and provided with projections out of contact with the casing, projects the material against the perforated casing, but in which the leaf and stem components are separated and separately collected.

In the accompanying drawing, illustrating various embodiments of this invention, Figure 1 is a general view in the form of a flow sheet illustrating an embodiment of this invention;

Figure 1:
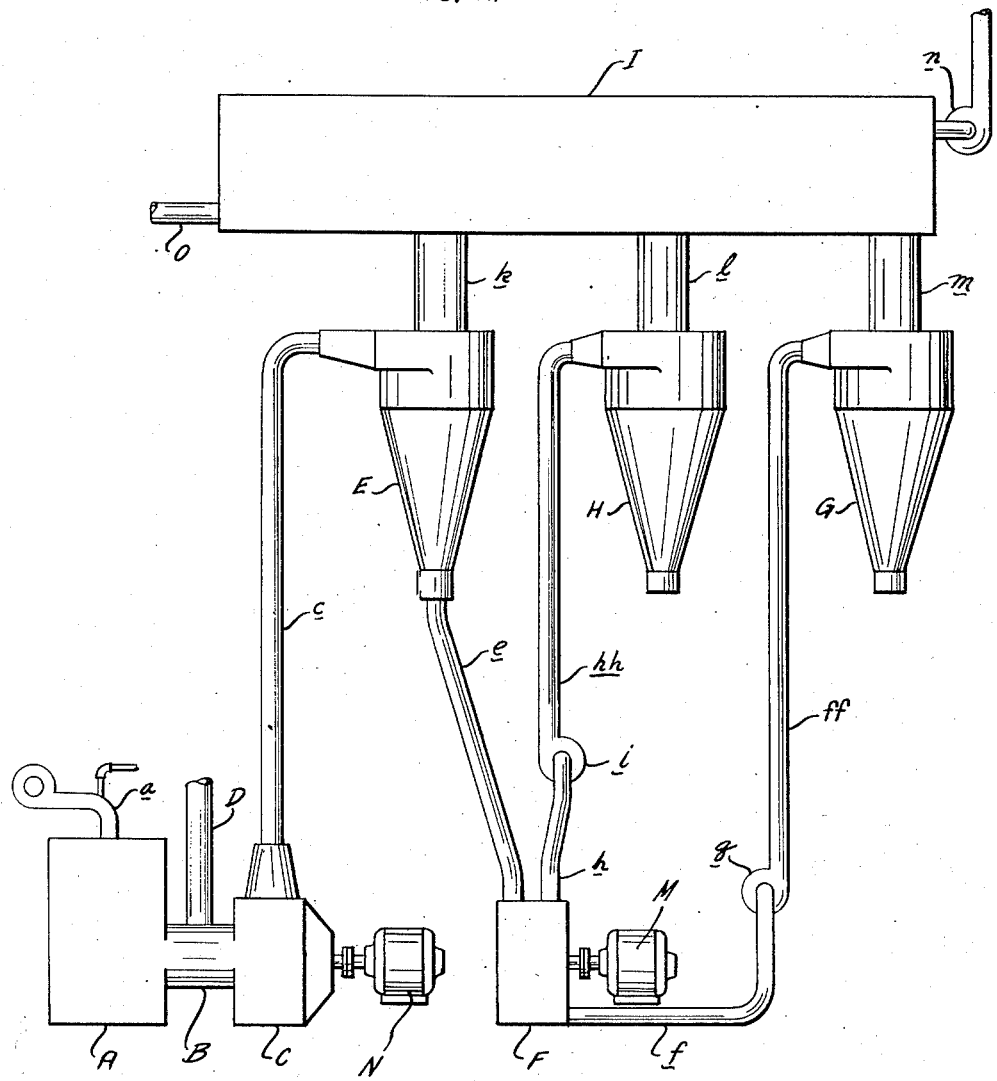
Figure 2:
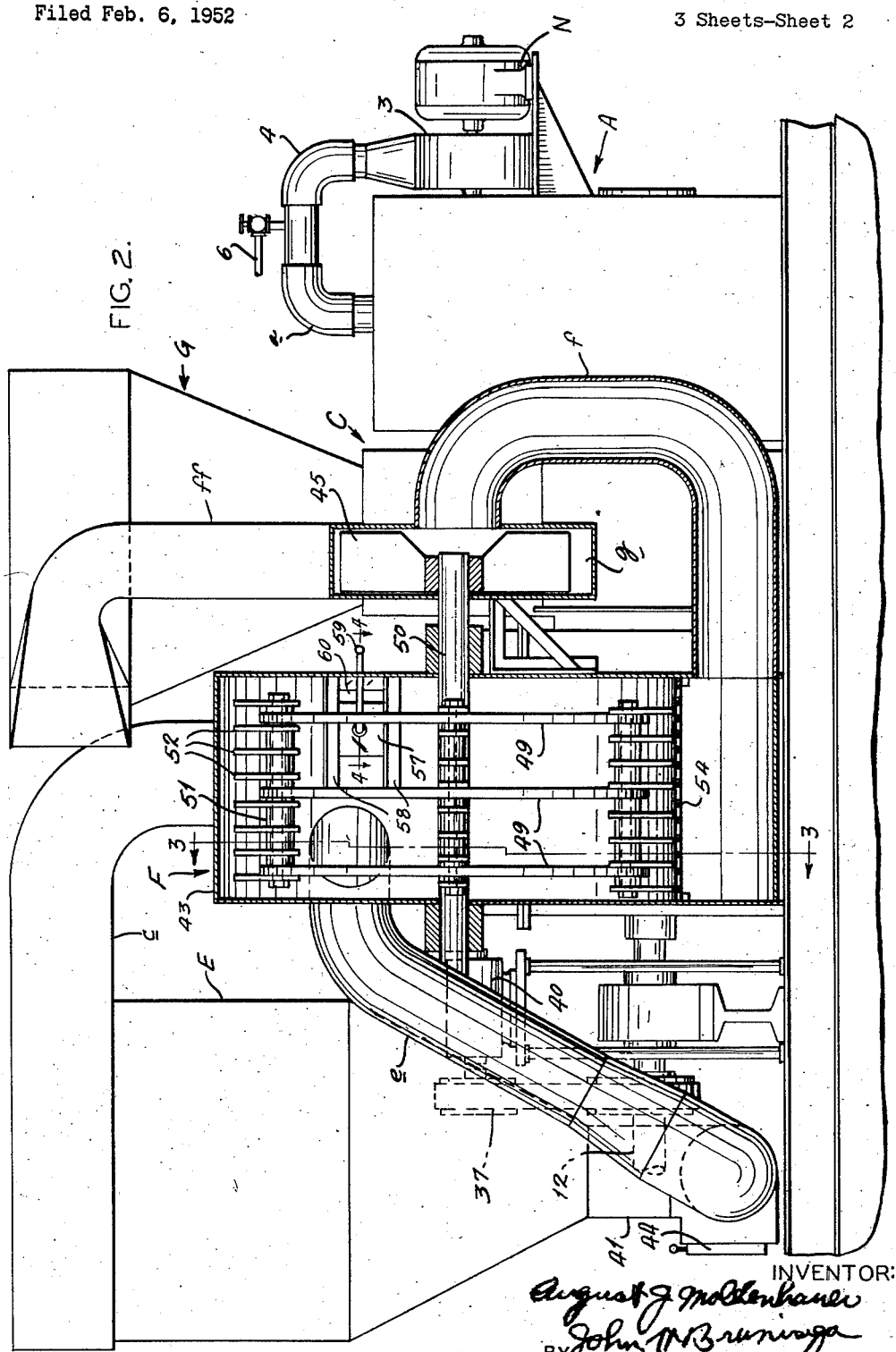
Figure 2 is a longitudinal vertical section of a hammer mill modified in accordance with this invention.
Figure 3:
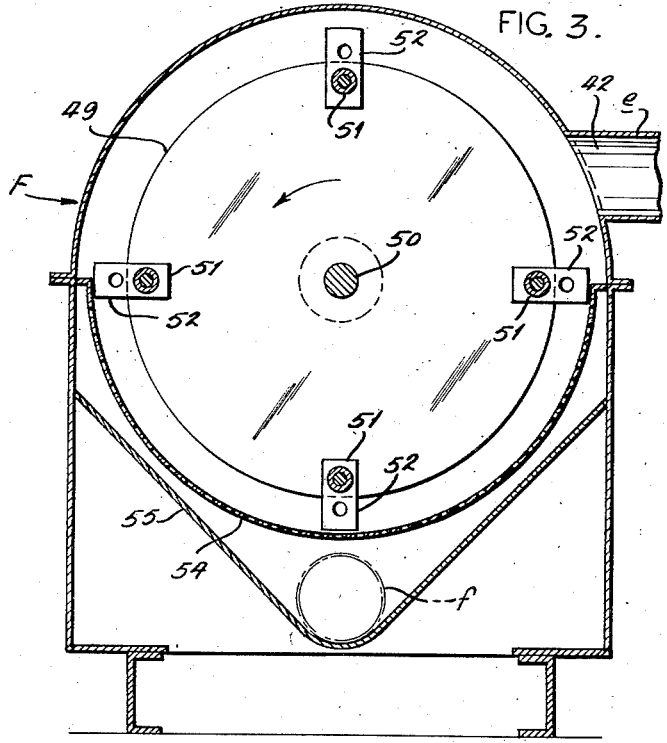
Figure 3 is a section on the line 3—3 of Figure 2.
Figure 4:
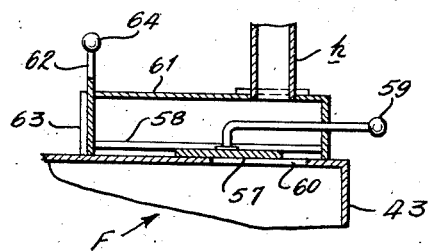
Figure 4 is a section on the line 4—4 of Figure 2.

Referring first to Figure 1, the parts have been more or less conventionally illustrated and designations applied, although the parts will be more fully described in Figures 2 to 4 inclusive. In Figure 1, A designates a furnace of a suitable construction, receiving fuel as shown at $a$. This furnace communicates with a casing B forming a chamber, and connected centrally with a centrifugal-impacting-comminuting or hammermilling mechanism C, which may be in the form of a hammer mill driven by a motor N and provided with a suitable rotor revolving inside of a perforated metal screen encompassing the rotor generally as usual in hammer mill structures. Such a hammer mill comprises, as usual, a casing having a hammermilling impeller rotating at a high speed inside of a screen in the casing, adapted to comminute the material by centrifugal-impact and adapted to pass the material, when fine enough, through the screen. Chopped fodder is fed into the chamber as generally shown at D onto the hot gases from the furnace to the hammer mill, where the fodder is subjected to simultaneous comminution and heat as described in applicant's Patent No. 2,588,865. The comminuted fodder and the gases passing through the screen are lead by a suitable duct or pipe $c$ to the top of a separator E, Fig. 1, which may be of the cyclone type. From the separator a pipe $e$ connects to one side of a second hammer mill F and to the interior thereof, this hammer mill being likewise provided with a suitable rotor and a suitable screen. The comminuted material and the gases issuing through the screen of the second hammer mill F are led by a duct or pipe $f$ through a blower $g$ by a duct or pipe $ff$ to the top of another cyclone type separator G, Fig. 1, from which the meal issues at the bottom; this is the leaf meal. The other side of the hammer mill is provided with an opening controlled by a valve, as hereinafter explained, from which the more coarsely comminuted stem components are led by a pipe $h$ through a blower $h$ by a duct or pipe $hh$ to another cyclone-type separator H (Fig. 1) for the stem meal.

The above is a description of the more complete embodiment in which the fodder is dehydrated before it is charged to a hammer mill. Chopped dried fodder either sun-cured or artifically dehydrated may, however, be fed into the duct or pipe $e$ directly to the hammer mill F. In Figure 2, which is a more condensed installation, the furnace A has been shown to the right of hammer mill F rather than to the left thereof, as shown in the flow sheet Figure 1.

In Figure 2, the furnace is shown at A and is provided with a blower 3, driven by a motor N, to deliver air by 4 with fuel such as oil from 6 to a pipe $a$ leading to the furnace A and with the gases delivered hence to the hammer mill C, from which the material is delivered by a pipe or duct $c$ to the separator E, from which the material passes by a neck 41 to pipe $e$ leading to the left end of the hammer mill F, with a gate 44 providing for admission of air to the duct $e$. As, however, described, the sun-cured or artificially dehydrated material may be delivered directly to the hammer mill F by the pipe or duct e via the parts E and 41. A blower g draws the material (leaf component) from the bottom of the hammer mill and delivers the same by pipe or duct ff to the separator G.

Referring now to Figures 2–4, a shaft 12 is driven by suitable means such as an engine or motor, not shown in Fig. 2, but see Figure 1, at M, which is adjustable as to speed so that the rotor of the hammer mill F may be run at the speed desired, which rotor speed, as usual in hammermilling, is high. The pulley on shaft 12 may be connected by suitable chain drive 37 to the shaft of a gear box 40 driving the shaft 50 of the hammer mill. The hammer mill has a rotor consisting of a series of impellers, herein the form of circular plates 49 mounted in spaced relation on the shaft 50. The rotor 45 of the blower g may also be driven by the shaft 50 as shown. Passing through the plates 49 at uniformly-spaced points of the peripheries are rods 51 on each of which is mounted a series of hammers 52. These hammers may be separated by spacing rings 53 on the rods 51. Each hammer is usually provided with two holes, as shown in Figure 3, so that it may be turned end-for-end on the rod 51 when one end becomes worn.

Surrounding the lower half of rotor is a screen 54 of perforated sheet metal. This screen is located sufficiently close to the tips of the hammers 52 to operate on the material, so as to project the material radially against and along the screen, permitting passage of the comminuted material through its perforations when sufficiently comminuted. The lower part of the housing is formed trough-shaped, as indicated at 55 in Figure 3. The duct f connects with the housing at the bottom of this trough so as to cause the blower g to draw out the material that passes through the screen 54 and pass it by duct ff to separator G.

As shown in Figure 2, the duct e connects with the upper part of the housing of the hammer mill F near one side, i. e. the left side thereof. This duct e serves, therefore, to deliver the material to the hammer mill at the left, while the duct f connects to the right side of the housing. This duct f leads into the suction side of the blower g, Figure 2, which leads by the duct ff, to a separator G. The blower g, therefore, draws the material from E, Figure 2, through conduit e to the left side of the hammer mill F and into the interior thereof for impact by the rotor which projects the material against the screen 54. As shown in Figures 2 and 4, the housing 43 of the mill F is provided with a gate 57 slidable in guides 58 and having an operating handle 59. This gate is adjustable to provide an exit opening 60 larger than the screen perforations to a casing 61. The suction duct h is connected to casing 61 opposite the opennig 60 and to the suction end of the blower i, Figure 1, from which leads a duct hh to the separator H. The right end of casing 61 is closed but its left end is provided with a gate 62, setable in guides 63 and provided with a handle 64. The guides 58 and 63 are sufficiently tight to hold the gates 57 and 62 in set positions. At a suitable point with reference to the duct e, an air inlet gate valve 44 may be provided so as to admit air with the material to the casing of the hammer mill.

The operation of comminuting the fodder is generally described in Patent No. 2,588,825 where the chopped fodder is dehydrated in furnace A and comminuted in hammer mill C and then delivered to hammer mill F. As above described, however, sun-cured or artifically dried fodder may be delivered directly to hammer mill F through the pipe e so as to be comminuted in the hammer mill F.

Returning now to the separation of the stems from the leaves, and referring to Figure 1 in connection wtih Figures 2, 3 and 4: it will be seen that the material enters the casing of the hammer mill F adjacent the left end and adjacent the inside wall of the casing and above the screen 54. This causes the finer leaf components to pass through the screen and these are delivered at the bottom and right end, Figure 2, by duct f leading to the suction side of the blower g which leads by a duct ff, Figure 2, to the separator G, Figures 1 and 2. The port 60 at the right end of the casing, Figures 2 and 4, opens into a casing 61 which is connected by a duct h through the exhaust blower i and by duct hh to the separator H. This causes an axial shifting of the coarser stem particles to the right end of and inside of the casing because of the suction on the port 60, and because these stem particles tend to remain coarser than the leaf particles. Accordingly, upon opening of the outlet port 60 at the right by manipulation of the valve 57, the suction blower i will draw these stem particles out of the hammer mill and conduct them to the separator G, while as noted above, the leaf particles pass to the separator G. The valve 62 is provided so that a proper draft will be secured to the duct h so as to inductively as well as positively cause the stem particles to pass by blower i into the duct hh and to storage. By manipulation of the valves 57, 62 and 44 any desired grade of stem components can be collected as related to the leaf components collected. In fact by this adjustment the portion of stem particles and the leaf meal can be reduced by any desired extent. This is of course a great advantage, because the leaf meal is much more valuable than is the stem meal, although the latter can be used as a filler in various feeds.

Perhaps the most valuable product is the very finely comminuted meal, particularly leaf meal, which ordinarily would be carried out of the top of the separators as a dust or as a fog. In accordance with this invention as shown in Figure 1, this dust is collected in the bag house (shown at I) from which it may be drawn. This bag house has a suction blower n and an air inlet o and is connected to the separators by pipes k, l and m. Such a bag house is of course a well-known piece of apparatus, so that detailed description thereof is not necessary.

Where the fodder is dehydrated by the employment of the furnace A connected with a hammer mill C through the passage B, these hot gases enter B and C at a high temperature. For example, where the temperature at B is from 1000° to 1500° F., the chopped material will be immediately subjected to that hot temperature and as the gases are drawn through the apparatus with the chopped material, this material is dehydrated during the course of the centrifugal-impacting comminution so that the material is rapidly dehydrated. While there is a rapid decrease of the temperature gradient, the temperature in the hammer mill will always be above the boiling point of water.

In accordance with the illustrative embodiment of this invention, the material is supplied to the hammer mill casing and is subjected to the action of a hammermilling impeller rotating on a horizontal axis at a high speed inside of a perforated screen in the casing so as to project the material radially and vertically against and along the screen in order to pass the finer component of the material through the screen; and the coarser component not passing through the screen is shifted horizontally to and through an outlet larger than the screen perforation, inside and adjacent to one (left) end of the casing. The passage of the coarser component through the outlet is controlled by a valve so as to control the discharge of the components. More specifically, the material is delivered to the casing at one end thereof while the outlet for the coarser component is at the other end of the casing. In the particular embodiment the shifting of the coarser component is accomplished by passing an air current horizontally along the inside of the casing from where the material enters (at left) to the outlet at the other end (right) of the casing in order to carry the coarser component to the outlet and this air is admitted to the casing with the delivered material; in such case, the current of air may be controlled by a valve (60) in the outlet for the coarser material and a valve (44) in the conduit delivering the material to the casing.

It will therefore be seen that the invention accomplishes its objects. A highly efficient process or method is provided to reduce fodder to meal. As described the fodder may be fed directly to the hammer mill F through pipe e as sun-cured fodder, cut up into short lengths. However, the fodder may be fed to the heating chamber B as green fodder, also cut up into short lengths and then to hammer mill C which may be constructed as hammer mill F to separate the leaf from the stem during the course of comminution. By virtue of the operation of the process in the manner heretofore described, not only is the comminution performed in a simple and effective manner, but even in such a manner as to retain the desired components of the original fodder.

What is claimed is:

1. In the art of comminuting fodder having leaf and stem components, the process comprising supplying the material inside of and laterally to one end of a casing, subjecting the material in the casing to the action of a hammering impeller rotating at a high speed on a horizontal axis inside of a perforated screen in the casing so as to project the material radially and vertically against and along the screen in order to pass the leaf component of the material through the screen, and causing shifting of the stem component not passing through the screen horizontally to and into an outlet larger than the screen perforation, inside of and adjacent to the other end of the casing.

2. In the art of comminuting fodder having leaf and stem components, the process comprising supplying the material inside of and laterally to one end of a casing, subjecting the material in the casing to the action of a hammering impeller rotating at a high speed on a horizontal axis inside of a perforated screen in the casing so as to project the material radially and vertically against and along the screen in order to pass the leaf component of the material through the screen, causing shifting of the stem component not passing through the screen horizontally to and into an outlet larger than the screen perforation, inside of and adjacent to the other end of the casing, and controlling the passage of the stem component through the outlet.

3. In the art of comminuting fodder having leaf and stem components, the process comprising, supplying the material to an inlet inside of a casing subjecting the material in the casing to the action of a hammering impeller rotating at a high speed on a horizontal axis inside of a perforated screen in the casing so as to project the material radially and vertically against and along the screen in order to pass the leaf component of the material through the screen, and passing an air current horizontally along the inside of the casing from the material inlet to an outlet larger than the screen perforation, inside and adjacent to one end of the casing in order to carry the stem component to the outlet.

4. In the art of comminuting fodder having leaf and stem components, the process comprising, delivering the material to a casing at one end thereof, subjecting the delivered material in the casing to the action of a hammering impeller rotating at a high speed on a horizontal axis inside of a perforated screen in the casing so as to project the material radially and vertically against and along the screen in order to pass the leaf component of the material through the screen, and passing an air current horizontally along the inside of the casing to an outlet larger than the screen perforation, inside and adjacent to the other end of the casing in order to carry the stem component to the outlet.

5. In the art of comminuting fodder having leaf and stem components, the process comprising, delivering the the material to a casing at one end thereof, subjecting the delivered material in the casing to the action of a hammering impeller rotating at a high speed on a horizontal axis inside of a perforated screen in the casing so as to project the material radially and vertically against and along the screen in order to pass the leaf component of the material through the screen, and passing an air current with the delivered material horizontally along the inside of the casing to an outlet larger than the screen perforation, inside and adjacent to the other end of the casing in order to carry the stem component to the outlet.

6. A hammer mill for comminuting materials, comprising, a casing, a perforated screen therein, a material inlet adjacent one end of said casing, a hammering impeller rotating at a high speed on a horizontal axis inside of said screen and adapted to project the material radially and vertically against and along said screen in order to pass the finer component of the material through said screen, an outlet larger than the screen perforation, from the inside of and adjacent the other end of said casing, means operating to shift coarser component not passing through said screen horizontally to said outlet, and means for controlling the size of said outlet.

7. A hammer mill for comminuting materials, comprising, a casing, a perforated screen therein, a material inlet to one end of said casing, a hammering impeller rotating at a high speed on a horizontal axis inside of said screen and adapted to project the material radially and vertically against and along said screen in order to pass the finer component of the material through said screen, an outlet larger than the screen perforation, from the inside of and adjacent the other end of said casing, and means operating to shift the coarser component not passing through said screen horizontally to said outlet.

8. A hammer mill for comminuting materials, comprising, a casing, a perforated screen therein, a material inlet adjacent one end of said casing, a hammering impeller rotating at a high speed on a horizontal axis inside of said screen and adapted to project the material radially and vertically against and along said screen in order to pass the finer component of the material through said screen, an outlet larger than the screen perforation, from the inside of and adjacent the other end of said casing and placed horizontally with respect to said inlet, and means for supplying an air current to the material inlet end of said casing and horizontally therealong to and into said outlet adapted to shift the coarser component not passing through said screen horizontally to said outlet.

9. A hammer mill for comminuting materials, comprising, a casing, a perforated screen therein, a material inlet adjacent one end of said casing, a hammering impeller rotating at a high speed on a horizontal axis inside of said screen and adapted to project the material radially and vertically against and along said screen in order to pass the finer component of the material through said screen, an outlet larger than the screen perforation, from the inside of and adjacent the other end of said casing and placed horizontally with respect to said inlet, and means for supplying air with the material to the material inlet end of said casing and horizontally therealong to and into said outlet adapted to shift the coarser component not passing through said screen horizontally to said outlet.

10. A hammer mill for comminuting materials, comprising, a casing, a perforated screen therein, a material inlet adjacent one end of said casing, a hammering impeller rotating at a high speed on a horizontal axis inside of said screen and adapted to project the material radially and vertically against and along said screen in order to pass the finer component of the material through said screen, an outlet larger than the screen perforation, from the inside of and adjacent the other end of said casing and placed horizontally with respect to said inlet, means for supplying an air current to the material inlet end of said casing and horizontally therealong to and into said outlet adapted to shift the coarser component not passing through said screen horizontally to said outlet, and means for controlling the size of said outlet.

11. A hammer mill for comminuting materials, comprising, a casing, a perforated screen therein, a material inlet adjacent one end of said casing, a hammering impeller rotating at a high speed on a horizontal axis inside of said screen and adapted to project the material radially and vertically against and along said screen in order to pass the finer component of the material through said screen, an outlet larger than the screen perforation, from the inside of and adjacent the other end of said casing and placed horizontally with respect to said inlet, means for supplying air with the material to the material inlet end of said casing and horizontally therealong to and into said outlet adapted to shift the coarser component not passing through said screen horizontally to said outlet, and means for controlling the admission of air with the material to the material inlet.

References Cited in the file of this patent

UNITED STATES PATENTS

| | | |
|---|---|---|
| 448,844 | Burnham et al. | Mar. 24, 1891 |
| 1,698,758 | Knittel | Jan. 15, 1929 |
| 2,013,476 | Peebles | Sept. 3, 1935 |
| 2,325,426 | Rietz | July 27, 1943 |
| 2,487,162 | Meyer et al. | Nov. 8, 1949 |
| 2,588,865 | Moldenhauer | Mar. 11, 1952 |
| 2,592,231 | Alsott | Apr. 18, 1952 |